March 8, 1938. H. B. KENDALL 2,110,442
POULTRY PICKING FRAME
Filed Nov. 15, 1935      2 Sheets-Sheet 1

Inventor

H. B. Kendall

By Clarence A. O'Brien and
Hyman Berman
Attorneys

March 8, 1938. H. B. KENDALL 2,110,442
POULTRY PICKING FRAME
Filed Nov. 15, 1935 2 Sheets-Sheet 2
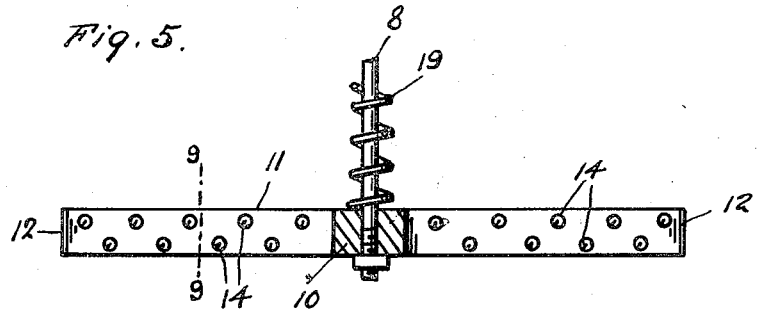
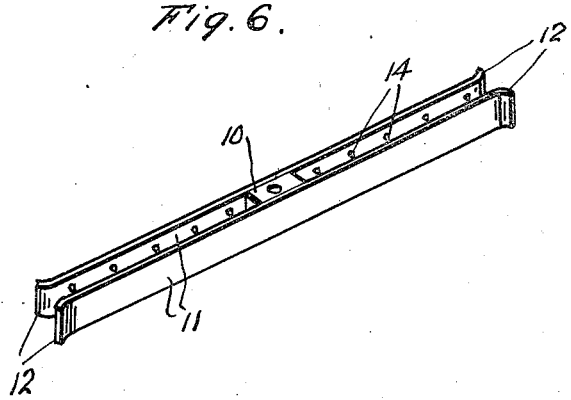
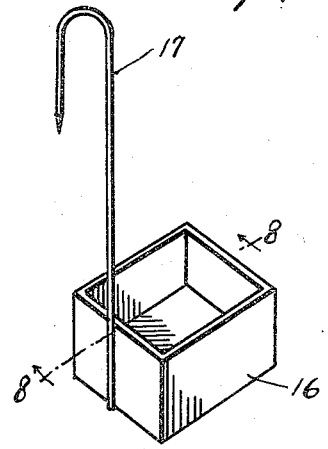
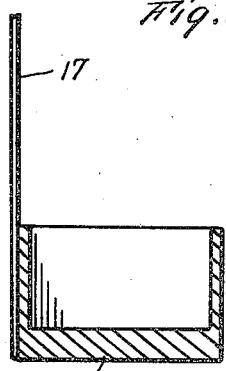
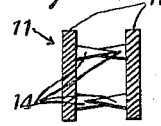
Inventor
H. B. Kendall
By Clarence A. O'Brien and Hyman Berman
Attorneys Patented Mar. 8, 1938

2,110,442

UNITED STATES PATENT OFFICE 2,110,442

POULTRY-PICKING FRAME

Harry B. Kendall, North Adams, Mass.

Application November 15, 1935, Serial No. 50,035

1 Claim. (Cl. 17—44.1)

The present invention relates to a frame designed for picking poultry such as chickens and the like and the object of the invention resides in the provision whereby a chicken may be easily and quickly engaged with the frame to permit the same to hang therefrom in such a manner that it may be readily picked.

Another object of the invention resides in the provision of a pan for catching the blood from the chicken's mouth while the same is hanging.

Another important object of the invention resides in the provision of a device of this nature which is exceedingly simple in its construction, inexpensive to manufacture, thoroughly efficient and reliable in use, easy to manipulate, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 5 is a detail sectional view taken substantially on the line 5—5 of Figure 1.

Figure 6 is a detail perspective view of the holding frame.

Figure 7 is a detail perspective view of the drip pan or tray.

Figure 8 is a detail sectional view taken substantially on the line 8—8 of Figure 7.

Figure 9 is a detail sectional view taken substantially on the line 9—9 of Figure 5.

Figure 1:
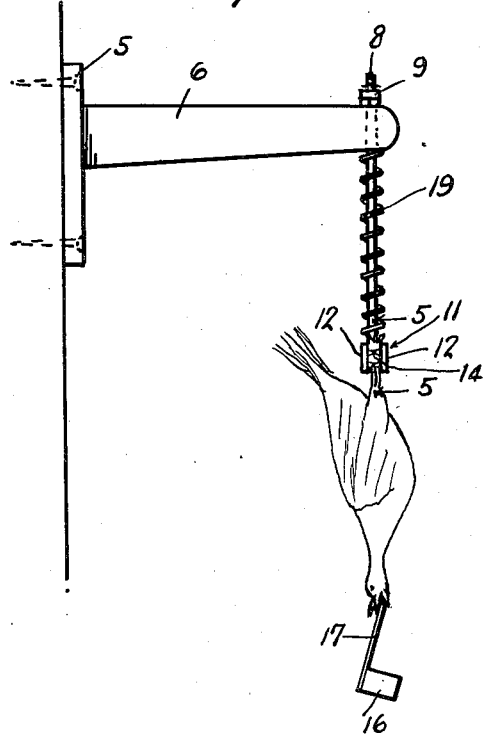
Figure 1 is a side elevation of an apparatus embodying the features of my invention.
Figure 2:
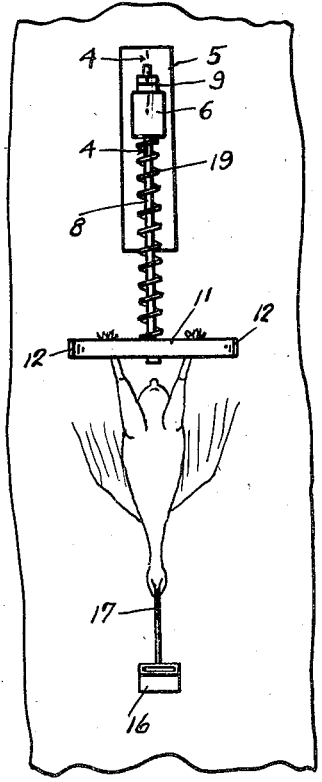
Figure 2 is a front elevation thereof.
Figure 3:
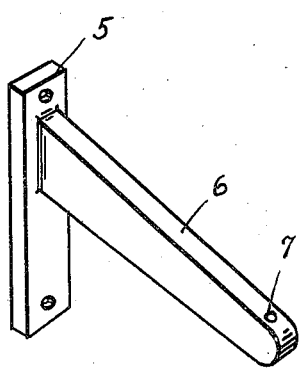
Figure 3 is a perspective view of the bracket.
Figure 4:
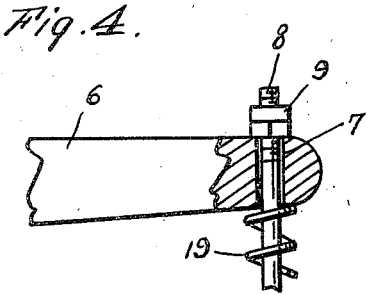
Figure 4 is a detail sectional view taken substantially on the line 4—4 of Figure 2.

Referring to the drawings in detail it will be seen that the numeral 5 denotes a plate adapted to be secured to a suitable support by suitable means and having extending substantially horizontally therefrom an arm 6 having in the terminal thereof an opening 7. Numeral 8 denotes a rod the upper end of which extends through the terminal 7 and the upper end of which above the arm 6 is threaded to receive nuts 9. The lower end of the rod 8 extends through a block 10 which forms parts of a frame including the sides of the block 10 a pair of elongated spaced parallel co-extensive oblong strips 11 the outer ends of which are flared outwardly from each other as indicated at 12, and these plates are provided on their inner faces with inwardly projecting teeth 14 preferably arranged in upper and lower rows. On each strip the teeth of the upper row are alternately arranged with respect to the lower row and the upper and lower row of one strip has its teeth arranged alternately with respect to the upper and lower rows respectively of the other strip. These strips are resilient and permit the insertion through the ends of the legs of a chicken or other poultry so that said chicken may hang as shown to advantage in Figures 1 and 2. With the chicken hanging in this position I provide a drip tray 16 having an elongated hook member 17 attached thereto and engageable in the mouth of the chicken to catch the blood dripping therefrom.

About the rod 8 I dispose a coil spring 19 which impinges against the arm 6 and against the block 10 to resist any twisting movement of the frame.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A poultry picking device comprising a frame, said frame comprising a block, a pair of parallel coextensive spaced strips having their intermediate portions fixed to the block on opposite sides thereof, said strips being resilient and having their outer ends flared outwardly from each other to facilitate the insertion of legs of the poultry between said strips, inwardly projecting teeth arranged in upper and lower rows on the strips, the teeth of the upper row on each strip being alternately arranged with respect to the teeth of the lower row, the teeth of the upper and lower rows of one strip being arranged alternately with respect to the upper and lower rows respectively of the other strip, a bracket, a rod depending from the bracket and attached to the block, and a coil spring about the rod impinging against the bracket and the block to resist rocking movement of the frame about the rod.

HARRY B. KENDALL.